United States Patent
Tokutake

(10) Patent No.: US 10,359,889 B2
(45) Date of Patent: Jul. 23, 2019

(54) TERMINAL DEVICE, INFORMATION PROCESSING METHOD, AND STORAGE MEDIUM

(71) Applicant: Sony Mobile Communications, Inc., Tokyo (JP)

(72) Inventor: Kenji Tokutake, Tokyo (JP)

(73) Assignee: SONY CORPORATION, Tokyo (JP)

( * ) Notice: Subject to any disclaimer, the term of this patent is extended or adjusted under 35 U.S.C. 154(b) by 814 days.

(21) Appl. No.: 13/904,742

(22) Filed: May 29, 2013

(65) Prior Publication Data

US 2013/0321335 A1    Dec. 5, 2013

Related U.S. Application Data

(60) Provisional application No. 61/652,482, filed on May 29, 2012.

(51) Int. Cl.
| | | |
|---|---|---|
| *G06F 3/044* | (2006.01) | |
| *G06F 3/0488* | (2013.01) | |
| *G06F 3/041* | (2006.01) | |
| *G06F 3/0485* | (2013.01) | |

(52) U.S. Cl.
CPC ............ *G06F 3/044* (2013.01); *G06F 3/0416* (2013.01); *G06F 3/0488* (2013.01); *G06F 3/0485* (2013.01)

(58) Field of Classification Search
CPC ........ G06F 3/041; G06F 3/044; G06F 3/0416; G06F 3/0488; G06F 3/0485
USPC .................................................. 345/173–178
See application file for complete search history.

(56) References Cited

U.S. PATENT DOCUMENTS

| | | | |
|---|---|---|---|
| 6,184,867 B1 * | 2/2001 | Kandogan et al. ........... 345/161 |
| 2009/0085881 A1 * | 4/2009 | Keam ............................ 345/173 |
| 2012/0092324 A1 * | 4/2012 | Buchan .............. G02B 26/0833 345/418 |
| 2012/0194454 A1 * | 8/2012 | Margalit et al. ............... 345/173 |
| 2013/0009910 A1 * | 1/2013 | Takano ......................... 345/174 |

FOREIGN PATENT DOCUMENTS

| | | |
|---|---|---|
| JP | 2011-008424 | 1/2011 |
| WO | WO 2011108650 A1 * | 9/2011 |

* cited by examiner

*Primary Examiner* — Wing H Chow
(74) *Attorney, Agent, or Firm* — Xsensus LLP

(57) ABSTRACT

An information processing apparatus that detects, at a touch panel formed on or integrally with a display, an object touching or approaching the touch panel; determines a change in an angle that the object forms with the touch panel based on an output of the touch panel; and controls content displayed on the display based on the determined change in angle between the object and the touch panel.

16 Claims, 11 Drawing Sheets

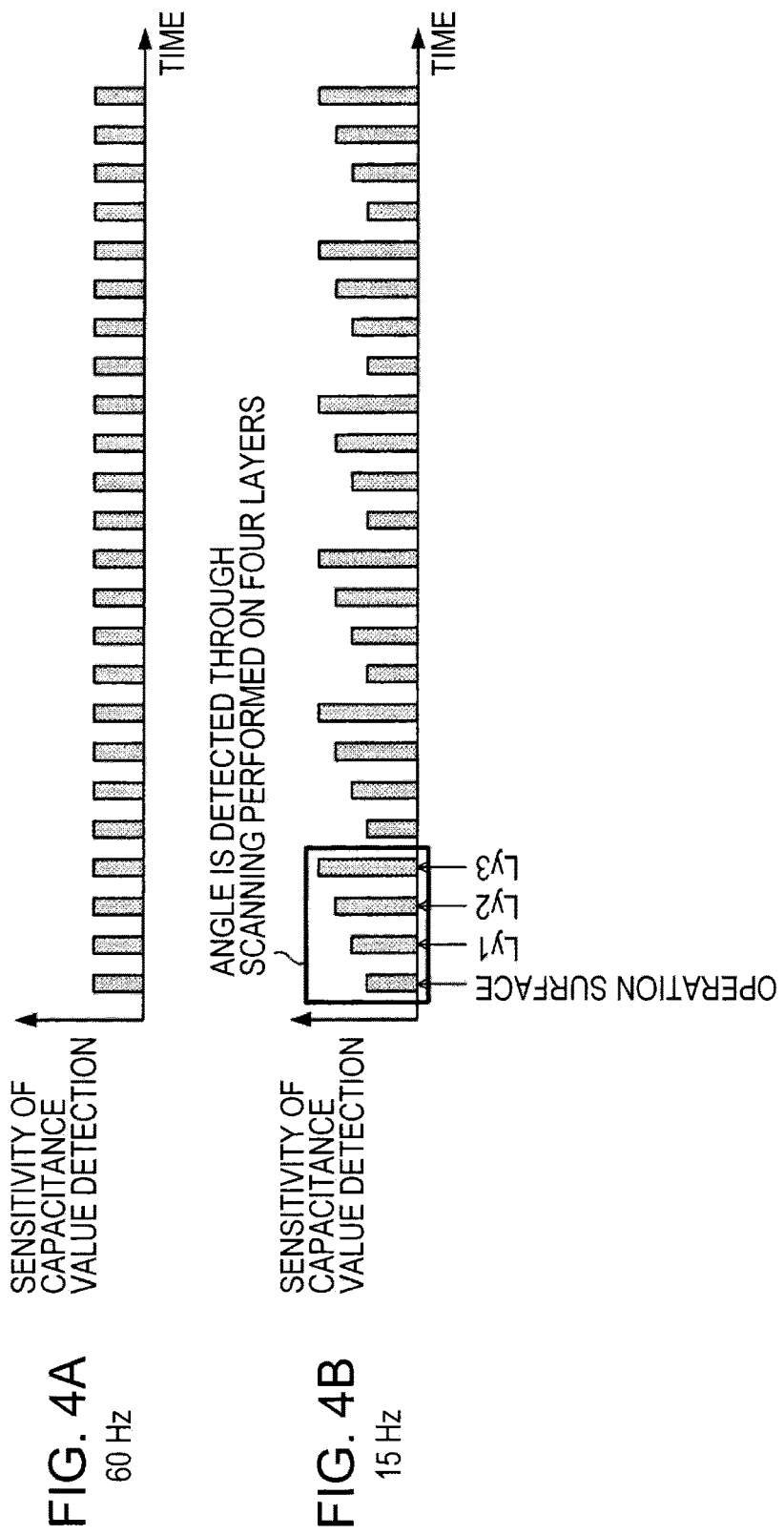

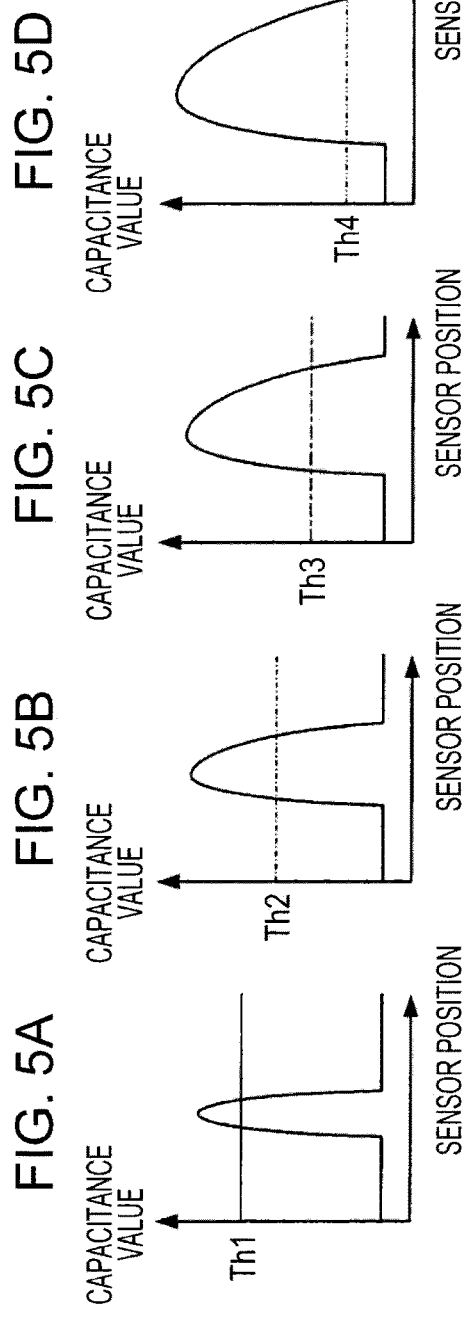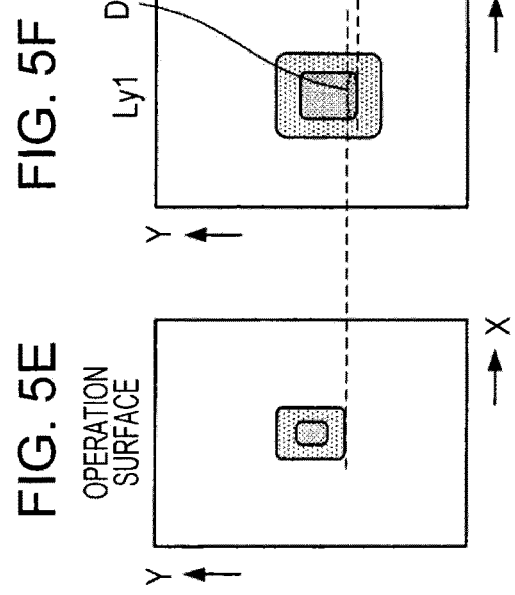

TERMINAL DEVICE, INFORMATION PROCESSING METHOD, AND STORAGE MEDIUM

CROSS REFERENCE TO RELATED APPLICATION

The present application claims the benefit of the earlier filing date of U.S. Provisional Patent Application Ser. No. 61/652,482 filed on May 29, 2012, the entire contents of which is incorporated herein by reference.

BACKGROUND

Field of the Disclosure

The present disclosure relates to a terminal device, an information processing method, and a storage medium that are suitably applied to an electronic device including a touch panel detecting an operation input to an operation surface based on a change in a capacitance occurring between an object that touches or approaches an operation surface and the operation surface.

Description of Related Art

In recent years, touch panels have been increasingly adopted for terminal devices including a mobile phone terminal, a high performance-type mobile information terminal having a conversation function, what is referred to as a smart phone, a tablet-type terminal, and so forth, as input devices for which users perform the operation input. The touch panel is a device including a display unit displaying an image, etc. and a position input device such as a touch sensor, which are integrated into one body.

As the sensing system of the touch panel, the resistive film system detecting a change in the resistance value of a touched part, the electromagnetic induction system detecting the electromagnetic energy of a specifically designed indicator generating a magnetic field, the capacitance system detecting a change in the capacitance value of a touched part, etc. have been available. Particularly, touch panels that are achieved under the capacitance system have been increasingly adopted for the above-described various terminal devices.

In a terminal device including a touch panel, specified operations are input by a user to various icons that are displayed on the screen of the display unit, for example. Consequently, various applications that are associated with the icons perform operations based on the details of the operation inputs. As operation input methods, a tap operation achieved by tapping the screen, a drag operation achieved by moving an indicator including a touched finger, a stylus pen, etc. from a specified position to a different position, a flick operation achieved by moving the finger or the indicator on the screen in such a way to make a quick sweeping stroke, and so forth have been available.

The various operations are determined based on, for example, information about a position defined by coordinates on the screen where a finger of the user or the indicator touches or approaches, which is attained during a series of operations performed from when the finger or the indicator touches the screen to when the finger or the indicator leaves the screen. More specifically, information about, for example, the amount of a change in the coordinate position per unit time, the moving speed of the coordinate position, an area on the screen where a touch is detected, etc. is used as information specifying the details of an operation input. In Japanese Unexamined Patent Application Publication No. 2011-8424, the setting of operation mode of an electronic device, which is achieved based on information about the form of an object such as a finger of a user, which touches the screen, is disclosed.

SUMMARY

In Japanese Unexamined Patent Application Publication No. 2011-8424, the method of scanning an object through the use of a light source of infrared radiation, which is provided in a liquid crystal panel, and the method of scanning an image with a photodiode, the image being obtained by an object that blocks natural light, are disclosed as methods of acquiring information about the form of an object such as the user's finger touching the screen.

The inventor of the present disclosure recognizes the necessity to allow a user to perform an operation according to an intuitive and easy method without adding a particular unit to a terminal device.

According to one exemplary embodiment, the present disclosure is directed to an information processing apparatus that detects, at a touch panel formed on or integrally with a display, an object touching or approaching the touch panel; determines a change in an angle that the object forms with the touch panel based on an output of the touch panel; and controls content displayed on the display based on the determined change in angle between the object and the touch panel.

BRIEF DESCRIPTION OF DRAWINGS

FIGS. 4A and 4B are graphs illustrating examples of scan processing performed for capacitance values according to an embodiment of the present disclosure, where 4A illustrates exemplary known processing and 4B illustrates exemplary processing performed according to an embodiment of the present disclosure.

FIGS. 5A-5H are diagrams illustrating exemplary distributions of capacitance values that are obtained on the layers of an operation surface and the imaginary plane parallel thereto, where 5A to 5D illustrate exemplary correspondences between the distributions of the capacitance values that are obtained on the layers and threshold values, and 5E to 5H illustrate exemplary distributions of capacitance values exceeding the thresholds values of the distributions of capacitance values that are obtained on the operation surface of a touch panel.

DETAILED DESCRIPTION

Hereinafter, embodiments of the present disclosure will be described. Further, the descriptions will be given in the following order.
1. Exemplary external configuration of Terminal device
2. Exemplary internal configuration of Terminal device
3. Method of Determining Angle of Finger and Orientation thereof
4. Exemplary use of Information about Angle of Finger and Orientation thereof
5. Exemplary modifications of various types

[1. Exemplary External Configuration of Terminal Device]

Figure 1:
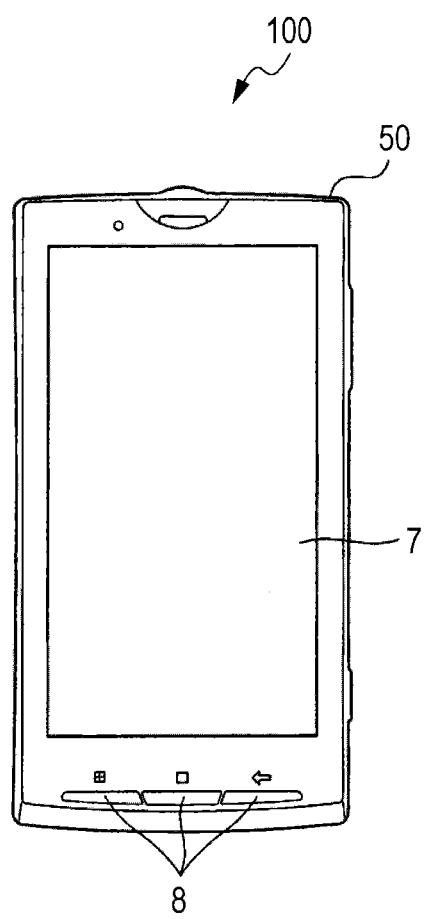
FIG. 1 is a schematic diagram illustrating an exemplary external configuration of a mobile phone terminal device according to an embodiment of the present disclosure.

First, an exemplary external configuration of a mobile phone terminal device 100 to which a terminal device of the present disclosure is applied will be described with reference to FIG. 1. FIG. 1 is a schematic diagram illustrating the exemplary external configuration of the mobile phone terminal device 100. The mobile phone terminal device 100 includes a cabinet 50, a touch panel 7 accommodated in the front part of the cabinet 50, and operation keys 8 that are provided on, for example, the end part of the front of the cabinet 50.

The touch panel 7 is a device including, for example, a touch sensor 71 configured as a sensor achieved under the capacitance system (see FIG. 2 that will be described later) and a display unit 73 including a liquid crystal panel or an organic EL (Electro Luminescence) panel, etc., which are formed into one body.

[2. Exemplary Internal Configuration of Mobile Phone Terminal Device]

Figure 2:
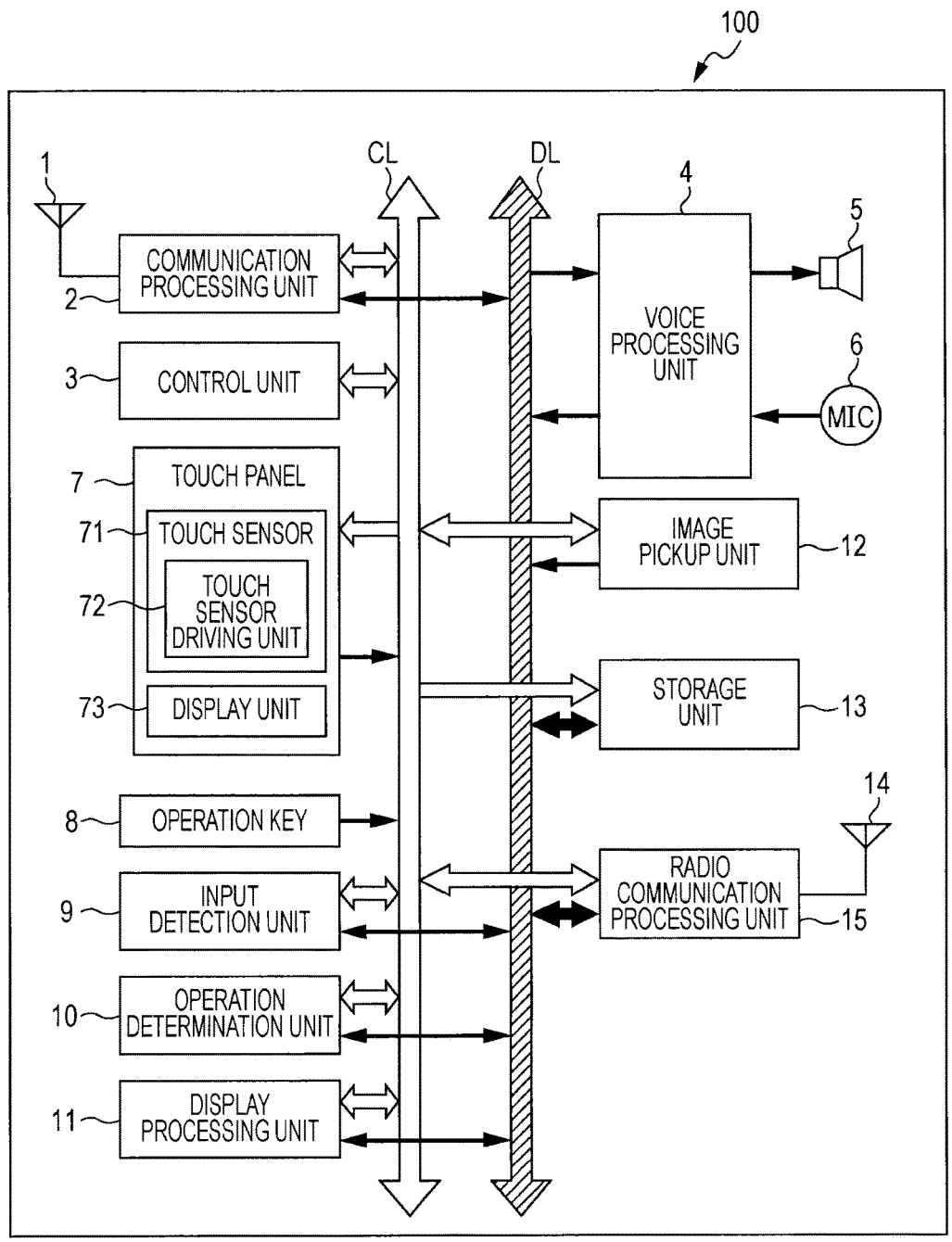
FIG. 2 is a block diagram illustrating an exemplary internal configuration of a mobile phone terminal device according to an embodiment of the present disclosure.

Next, an exemplary configuration of the mobile phone terminal device 100 will be described with reference to FIG. 2. The mobile phone terminal device 100 includes an antenna 1 performing transmission and reception of an electric wave between a radio telephone base station and the mobile phone terminal device 100, a communication processing unit 2 to which the antenna 1 is connected, and a control unit 3. Further, a voice processing unit 4, a speaker 5, and a microphone 6 are included.

The communication processing unit 2 performs radio communications with the radio telephone base station under control of the control unit 3. At the voice communication time, voice data included in data received by the communication processing unit 2 is supplied to the voice processing unit 4. Then, the voice processing unit 4 performs decoding processing for the voice data so that an analog voice signal is obtained. The analog voice signal obtained with the voice processing unit 4 is supplied to the speaker 5, and output as a voice. A voice signal collected and acquired with the microphone 6 is also supplied to the voice processing unit 4, and encoded into voice data in a specified encoding format with the voice processing unit 4. Then, the acquired voice data is supplied to the communication processing unit 2, and emitted through the antenna 1 as a radio wave.

The processing units including the communication processing unit 2, the voice processing unit 4, and so forth exchange control data with the control unit 3 via a control line CL, and transfer data via a data line DL. The control unit 3 includes a CPU (Central Processing Unit), a GPU (Graphics Processing Unit), and so forth, and performs control for the units constituting the mobile phone terminal device 100. For example, changing a command issued for an application program stored in a storage unit 13 that will be described later, etc. are performed based on a result of the operation determination performed with an operation determination unit 10 that will be described later.

Further, the mobile phone terminal device 100 includes the touch panel 7, the operation keys 8, an input detection unit 9, the operation determination unit 10, and a display processing unit 11. In the touch panel 7, a touch sensor 71, a touch sensor driving unit 72, and a display unit 73 are included. The touch sensor 71 is configured as, for example, a sensor achieved under the mutual capacitance system of the projected capacitance system, and includes transmission electrodes (TX) and reception electrodes (RX) that are not shown, which are arranged in matrix form in the X direction and the Y direction.

By grounding the reception electrode and inputting a drive pulse to the transmission electrode, an electric field is generated between the transmission electrode and the reception electrode. When an object (electric conductor) including a user's finger, a stylus pen, and so forth approaches, part of the electric field is absorbed in the electric conductor so that the electric field generated between the transmission electrode and the reception electrode is decreased. Consequently, an electric charge (capacitance value) occurring in the reception electrode is also decreased. As a result, the measurement of a decrease in the electric charge, the decrease being associated with a decrease in the electric field generated between the transmission electrode and the reception electrode, allows for detecting that the operation surface of the touch panel 7 is touched/untouched.

The touch sensor driving unit 72 inputs a drive pulse to each transmission electrode and detects the electric charge of the reception electrode. The input detection unit 9 detects whether the operation surface of the touch panel 7 is touched or untouched by the object by measuring a change in the capacitance value detected with the touch sensor driving unit 72. Further, information about an XY coordinate position defined on the operation surface where the touch or the approach is detected is output.

The operation determination unit 10 determines the type of an object that touches or approaches the operation surface of the touch panel 7 (whether or not it is a finger, etc.) based on information about a distribution of the capacitance values that are detected with the input detection unit 9, the distribution being attained on the surface (hereinafter referred to as an "operation surface") of the touch panel 7, the magnitude of the capacitance value, and so forth. Further, of a series of operations performed from when the object touches the operation surface to when the object leaves the operation surface, the operation determination unit 10 determines the details of an operation input by the user based on, for example, information about a coordinate position defined on a screen image where the object touches or approaches. The details of the operation input made by the user indicate a pinch (pinch-in/pinch-out) operation achieved by decreasing and increasing the space between two fingers, etc. in addition to the above-described tap operation, drag operation, and flick operation. Then, the operation determination unit 10 transmits the determined details of the operation to the control unit 3.

In the present disclosure, not only the distribution (first distribution) of capacitance values (first capacitance values) that are obtained on the operation surface of the touch panel 7, but also the distribution (second distribution) of capacitance values (second capacitance values) that are attained on an imaginary plane that is away from the operation surface by as much as a specified distance is detected. Then, the angle of a finger touching the operation surface and the direction (orientation) thereof are determined based on the information of a difference between the distribution of the first capacitance values and the distribution of the second capacitance values. The capacitance values that are obtained on the imaginary plane can be detected by strengthening the electric field formed on the operation surface by increasing the drive pulse applied to the transmission electrode with the touch sensor driving unit 72, that is, increasing the sensitivity of the capacitance value detection. The details of the changing the sensitivity of the capacitance value detection and the method of determining the angle of the finger touching the operation surface and the direction thereof will be described later.

The display processing unit 11 performs processing that causes the display unit 73 to display a screen image relating to an executed application under control of the control unit 3. For example, processing including scrolling a browser, etc. up or down for display, moving a screen image based on the flick operation, reducing or enlarging a selected spot for display based on the pinch operation, and so forth is performed based on the details of an operation performed for the operation surface of the touch panel 7.

Further, the mobile phone terminal device 100 includes an image pickup unit 12, a storage unit 13, and a radio communication processing unit 15. The image pickup unit 12 has an image sensor including a CCD (Charge Coupled Device), a CMOS (Complementary Metal Oxide Semiconductor), and so forth, and generates an image signal by performing photoelectric conversion for a subject light formed via a lens that is not shown on the light receiving surface thereof.

The storage unit 13 includes a ROM (Read Only Memory) and/or a RAM (Random Access Memory), and stores various application programs, data necessary to execute them, and so forth. The radio communication processing unit 15 performs communications with peripheral devices by radio according to instructions based on a specified communication standard via a connected antenna 14.

[3. Method of Determining Angle of Finger and Orientation Thereof]

Figure 3A:
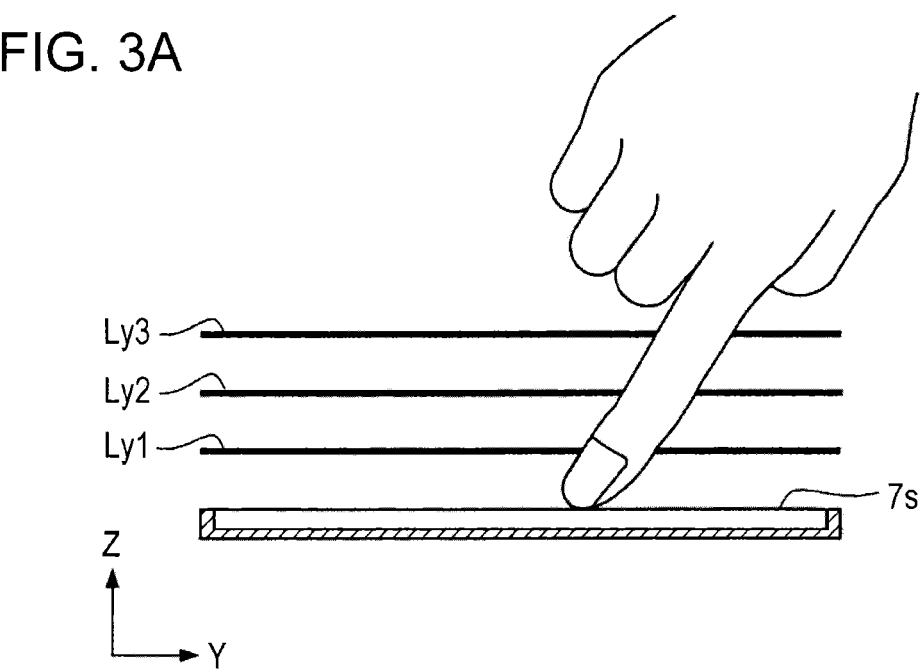
FIGS. 3A and 3B are explanatory diagrams illustrating an exemplary configuration achieved to detect capacitance values that are attained on an imaginary plane, where 3A is a side view and 3B is a perspective view.
Figure 3B:
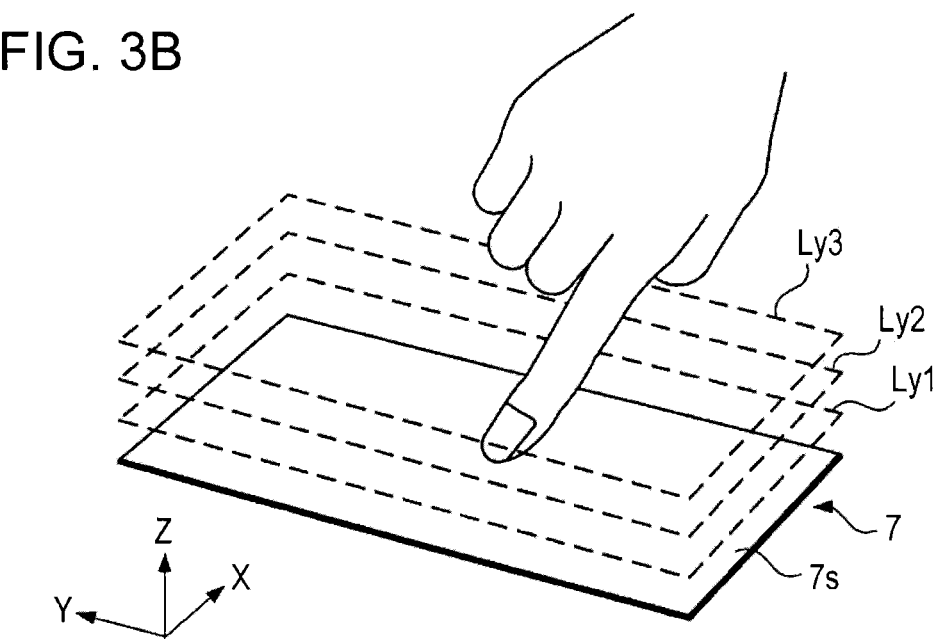

Next, exemplary methods of determining the angle of a finger touching the operation surface and the direction thereof according to embodiments of the present disclosure will be described with reference to FIG. 3A to FIG. 12. FIGS. 3A and 3B are diagrams illustrating an exemplary configuration achieved to detect capacitance values that are obtained on the operation surface 7 and the imaginary planes according to an embodiment of the present disclosure, where FIG. 3A is a side view obtained when the mobile phone terminal device 100 is viewed from its longitudinal direction (Y direction)-side and FIG. 3B is a perspective view obtained by viewing the mobile phone terminal device 100 from a diagonally upper direction.

In the present disclosure, not only the capacitance values that are obtained on the operation surface, but also the capacitance values that are obtained on the imaginary planes that are away from the operation surface by as much as the specified distances are referenced, as described above, to determine the angle of a finger touching the operation surface and the direction thereof That is, capacitance values are scanned for each of plural layers (hereinafter referred to as "layers") that are superimposed on one another in a Z-axis direction (the normal direction) perpendicular to an operation surface $7s$ of the touch panel 7, and the angle of a finger touching the operation surface and the direction thereof are determined based on information about the capacitance values that are obtained on each layer.

In FIG. 3A and FIG. 3B, an example where capacitance values are scanned on the operation surface $7s$ of the touch panel and layer Ly1 to Layer Ly3 that are away from the operation surface $7s$ in the Z-axis direction by as much as specified distances, that is, four layers in total, is illustrated. The operation surface $7s$ is distant from, in increasing order of distance, the layer Ly1, the layer Ly2, and the layer Ly3 in the Z direction. The distance between the operation surface $7s$ and the layer Ly3 may be set to 10 mm, etc., for example.

The layer Ly1 to the layer Ly3 are achieved by dynamically setting the sensitivity of the capacitance value scanning and a threshold value determining a value detected as a capacitance value to values that are appropriate for each layer Ly. The capacitance value of each of layers including the operation surface $7s$ to the layer Ly3 can be acquired by changing the settings on the sensitivity and the threshold value that are appropriate for each layer Ly for every single frame and performing the capacitance value scanning for every frame.

FIGS. 4A and 4B are graphs illustrating exemplary processing performed to scan capacitance values. The vertical axis of the graph indicates the sensitivity of the capacitance value scanning (the magnitude of a drive pulse applied to the transmission electrode), and the horizontal axis indicates the time. Conventionally, as illustrated in FIG. 4A, the sensitivity is made constant at the capacitance value scanning time, and the scanning is performed at a rate of 60 Hz or the like, for example. Consequently, a capacitance value is acquired every 1/60 second.

On the other hand, in the present disclosure, the sensitivity set to perform the capacitance value scanning is gradually increased for the operation surface, for the layer Ly1, for the layer Ly2, and for the layer Ly3, as illustrated in FIG. 4B. Then, the angle and the orientation of a finger are calculated based on information about capacitance values that are obtained on those four layers. Consequently, in the light of the capacitance value scanning necessary to determine the details of an operation input, the rate is decreased to 15 Hz. However, since the processing speeds of recent devices are increased, it has become less difficult to retain usual scan rates.

FIGS. 5A-5H are diagrams illustrating exemplary distributions of capacitance values that are obtained on the layers. FIG. 5A to FIG. 5D illustrate exemplary correspondences between the distributions of the capacitance values that are obtained on the layers and threshold values Th, where the vertical axes indicate capacitance values and the horizontal axes indicate the coordinates (sensor position) of the touch sensor 71 (see FIG. 2) on the operation surface 7s. FIG. 5E to FIG. 5H illustrate exemplary distributions of capacitance values exceeding the threshold values Th of the distributions of capacitance values that are obtained on the plane of the touch panel 7.

On the layers, it is determined whether or not an object causing a change in the capacitance values is an effective object such as a finger based only on capacitance values exceeding a threshold value Th1 to a threshold value Th4 that are provided for the layers of capacitance values that are obtained as a result of the scanning. Therefore, the distribution of capacitance values exceeding the threshold value Th of the distributions of the capacitance values of the plane of the touch panel 7 can also be called an "effective determination range" used for processing performed to determine the angle and the orientation of a finger.

On the operation surface 7s, as illustrated in FIG. 4B, the sensitivity of the capacitance value scanning is set to the same level as in the past. Therefore, capacitance values that are obtained on the periphery of the spot where the object such as the finger touches are acquired. Consequently, the waveform of capacitance values, which is attained with the sensor plane as an axis, becomes acute and peaks at the finger touch spot as illustrated in FIG. 5A. Further, the effective determination range becomes narrow as illustrated in FIG. 5E.

On the layer Ly1, as illustrated in FIG. 4B, the sensitivity of the capacitance value scanning is set to be slightly higher than that set on the operation surface 7s. Therefore, capacitance values are acquired on a larger area around the spot where the object touches. Consequently, as illustrated in FIG. 5B, the peak of the waveform of capacitance values, the waveform being attained with the sensor plane as axis, becomes higher than at the time when the scanning is performed for the operation surface 7s, and the angle is slightly eased. Further, since the threshold value Th2 (second threshold value) is set to be lower than the threshold value Th1 (first threshold value), the effective determination range becomes slightly larger than at the time when the scanning is performed for the operation surface 7s as illustrated in FIG. 5F. A range indicated by a broken line in FIG. 5F illustrates a difference Df1 between the distribution of capacitance values that are obtained through the scanning performed for the layer Ly1 and the distribution of capacitance values.

On the layer Ly2, as illustrated in FIG. 4B, the sensitivity of the capacitance value scanning is set to be slightly higher than that set on the layer Ly1. Therefore, capacitance values are acquired on a larger area around the spot where the object touches. Consequently, as illustrated in FIG. 5C, the peak of the waveform of capacitance values, the waveform being attained with the sensor plane as axis, becomes higher than at the time when the scanning is performed for the layer Ly1, and the angle becomes easier. Further, since the threshold value Th3 is set to be lower than the threshold value Th2, the effective determination range becomes slightly larger than at the time when the scanning is performed for the layer Ly1 as illustrated in FIG. 5G A range indicated by a broken line in FIG. 5G illustrates a difference Df2 between the distribution of capacitance values that are obtained through the scanning performed for the layer Ly2 and the distribution of capacitance values.

On the layer Ly3, as illustrated in FIG. 4B, the sensitivity of the capacitance value scanning is set to be slightly higher than that set on the layer Ly2. Therefore, capacitance values are acquired on a large area including the periphery of the spot where the object touches. Consequently, as illustrated in FIG. 5D, the peak of the waveform of capacitance values, the waveform being attained with the sensor plane as axis, becomes still higher than at the time when the scanning is performed for the layer Ly2, and the angle becomes easier. Further, since the threshold value Th4 is set to be lower than the threshold value Th3, the effective determination range becomes slightly larger than at the time when the scanning is performed for the layer Ly2 as illustrated in FIG. 5H. A range indicated by a broken line in FIG. 5H illustrates a difference Df3 between the distribution of capacitance values that are obtained through the scanning performed for the layer Ly3 and the distribution of capacitance values.

The angle of a finger touching the operation surface 7s and the orientation thereof can be determined by referencing the directions of changes in the difference Df1 to the difference Df3 of the capacitance value distributions between the layers, the changes occurring on the plane of the operation surface, and the change amount thereof, which are illustrated in FIG. 5F to FIG. 5H.

Figure 6:
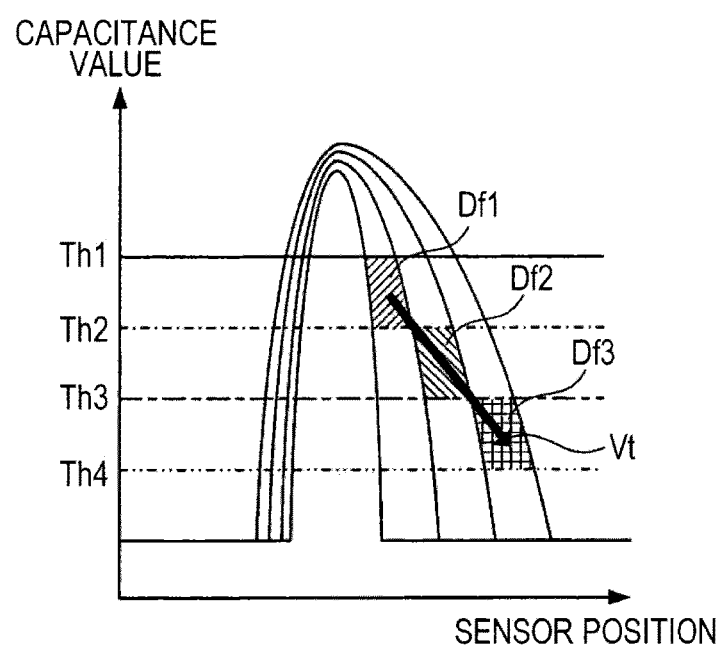
FIG. 6 is a diagram illustrating the differences between the distributions of the capacitance values where the differences are superimposed on a single graph.

FIG. 6 clearly illustrates the difference Df1 to the difference Df3 by superimposing all the waveforms of the capacitance value distributions that are illustrated in FIG. 5A to FIG. 5D. As illustrated in FIG. 6, it is apparent that changes in the difference Df1 to the difference Df3, the changes occurring on the coordinate system where a sensor position is determined to be the horizontal direction and a capacitance value is determined to be the vertical direction, have a vector Vt in the lower right direction. The angle and the orientation of a finger can be calculated based on the vector Vt.

Figure 7:
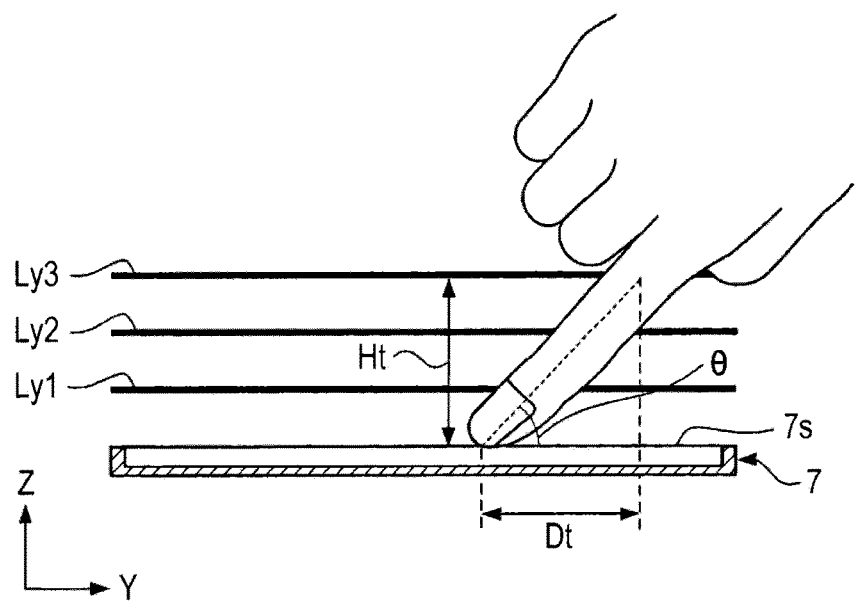
FIG. 7 is an explanatory diagram illustrating an exemplary calculation of the angle and the orientation of a finger, which is performed according to an embodiment of the present disclosure.

FIG. 7 is a diagram illustrating an exemplary calculation of the angle and the orientation of a finger. In FIG. 7, the parts corresponding to those of FIG. 3A are designated by the same reference numerals, and redundant description is omitted. When a distance Dt from the spot where the finger touches the operation surface 7s to the spot where the finger and the layer Ly3 intersect, which is defined on the plane of the operation surface 7s, is 10 mm, for example, and a height Ht from the operation surface 7s to the layer Ly3 is 10 mm, the angle of the finger can be calculated as 45°. The distance Dt can be calculated based on the difference Df1 to the difference Df3 that are illustrated in FIG. 6.

Thus, by using information about the difference between the distribution of capacitance values that are obtained on the current layer and the distribution of capacitance values, capacitance values that are obtained on a higher layer including the layer Ly3 or the like where the effective determination range thereof is increased as a result of increasing the sensitivity can also be used to determine the angle and the orientation of a finger. That is, since the angle and the orientation of a finger is calculated by referencing not only the operation surface 7s, but also the capacitance value distribution information obtained on imaginary planes (the layer Ly1 to the layer Ly3), the angle of the finger and the orientation thereof are calculated with higher precision.

[4. Exemplary Use of Information about Angle of Finger and Orientation Thereof]

Figure 8A:
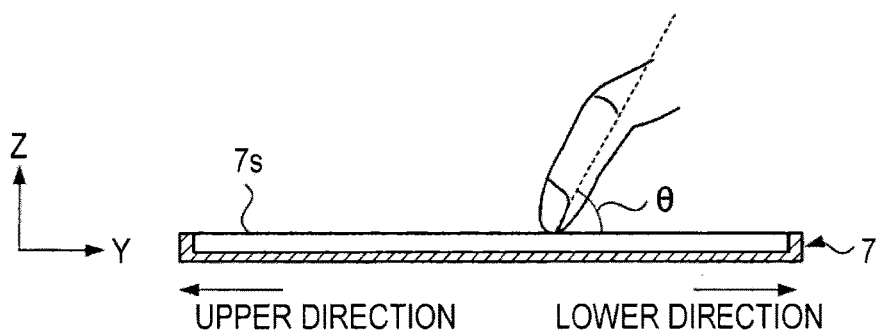
FIGS. 8A and 8B are explanatory diagrams illustrating an exemplary change in the angle that a finger touching the operation surface makes with the operation surface, where 8A illustrates an example where the angle is an obtuse angle and 8B illustrates an example where the angle is an acute angle.
Figure 8B:
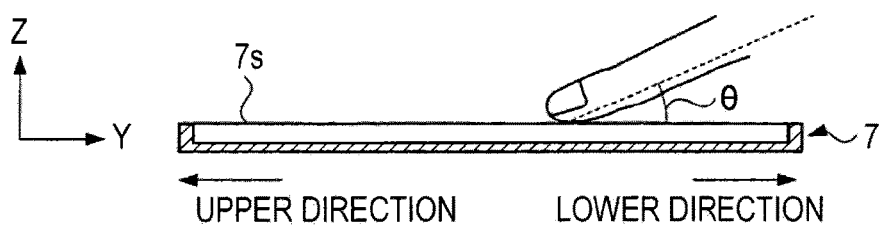
Figure 9:
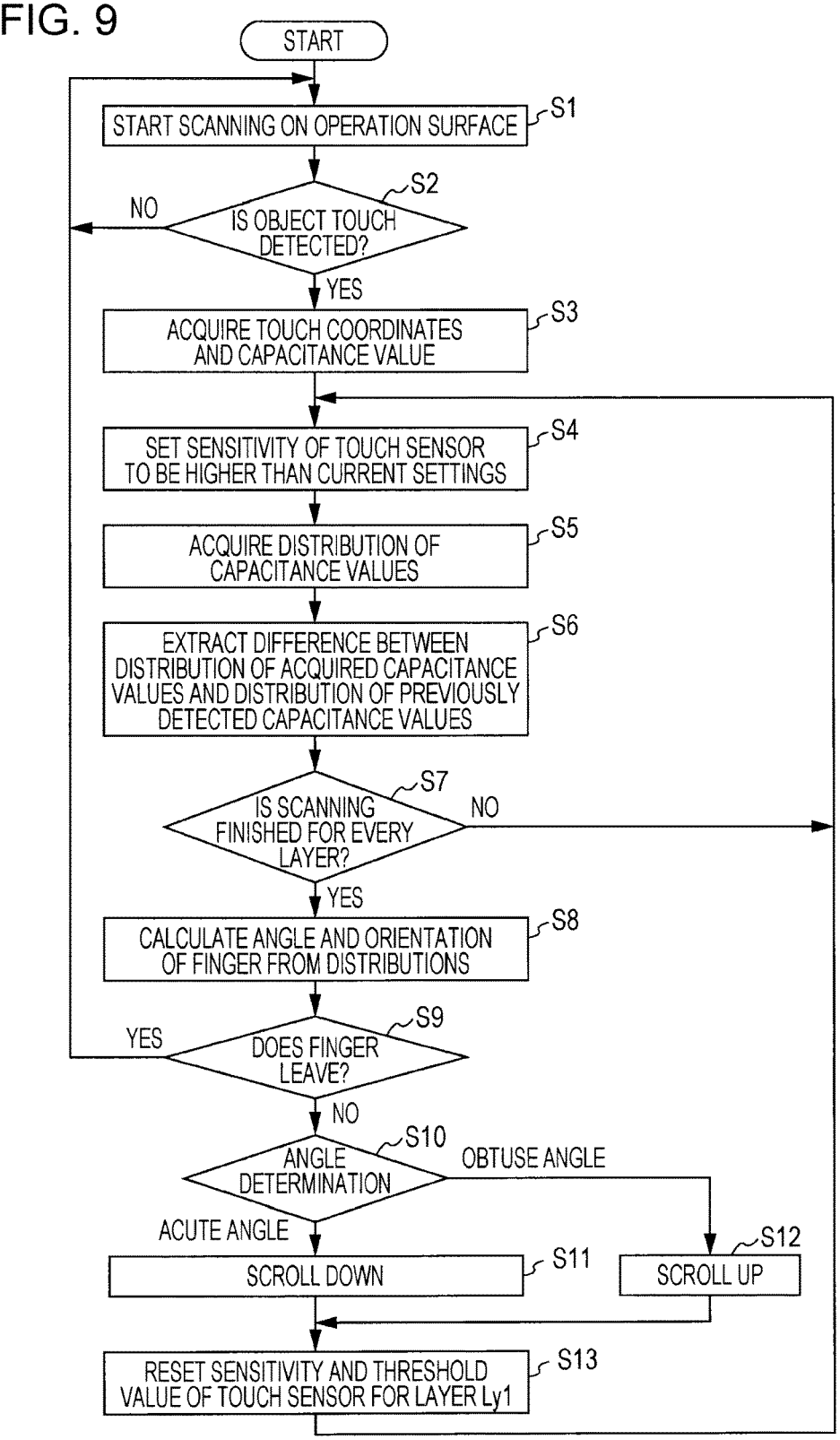
FIG. 9 is a flowchart illustrating examples of processing performed to calculate the angle and the orientation of a finger touching the operation surface and processing performed to control an application (the details of a display produced on a display unit) based on the calculation information, which are performed according to an embodiment of the present disclosure.

Next, exemplary specific control of an application, which is performed based on information about the angle of a finger and the orientation thereof will be described with reference to FIGS. 8A, 8B and 9. In FIGS. 8A, 8B and 9, an example where information about the angle of the finger and the orientation thereof affects an operation of scrolling up/down a screen image displayed in a browser or the like is illustrated. In FIGS. 8A and 8B, the parts corresponding to those of FIG. 3A and FIG. 7 are designated by the same reference numerals, and redundant description is omitted.

When the finger touches the operation surface 7s in a standing state as illustrated in FIG. 8A, that is, when an angle θ in the Z direction, which is formed with the operation surface 7s, is in the 60°<θ≤90° range (hereinafter, an angle of the range (first angle range) is also referred to as an (obtuse angle)), the control unit 3 performs control to scroll up a screen image displayed on the display unit 73 for the display processing unit 11 (see FIG. 2). That is, a movement is accomplished in the upper direction of the screen image (first direction). Further, when the finger touches the operation surface 7s in a lying state as illustrated in FIG. 8B, that is, when the angle θ in the Z direction, which is formed with the operation surface 7s, is in the 0°<θ≤30° range (hereinafter, an angle of the range (second angle range) is also referred to as an (acute angle)), the control unit 3 performs control to scroll down a screen image displayed on the display unit 73 for the display processing unit 11. That is, the screen image is moved in the lower direction (second direction). When the angle θ which the finger forms with the operation surface 7s is in the 30°<θ≤60° range (hereinafter, the range (third angle range) is also referred to as a "neutral angle"), neither the scroll-up processing nor the scroll-down processing is performed.

FIG. 9 is a flowchart illustrating exemplary processing performed from the start of the capacitance value scanning to the application control in the use case illustrated in FIGS. 8A and 8B. First, capacitance values that are obtained on the operation surface 7s are scanned (step S1) with the touch sensor driving unit 72 (see FIG. 2), and the input detection unit 9 determines whether or not the touch of an object such as a finger is detected (step S2).

During the interval that no object touch is detected, the determination of step S1 is continuously performed. When the object touch is detected, coordinates on the touch sensor 71 touched by the object and detected capacitance values are acquired (step S3). When the touch is detected, the sensitivity of the touch sensor 71 is increased (step S4) with the objective of detecting capacitance values that are obtained on an upper layer Ly, and capacitance values that are acquired with the sensitivity and that exceed a specified threshold value Th that had already been set are acquired (step S5). Then, a difference between the distribution of the acquired capacitance values and the distribution of previously detected capacitance values is extracted (step S6) with the operation determination unit 10 (see FIG. 2).

Subsequently, it is determined whether or not the scanning is finished on every layer Ly (step S7), and when it is not finished, the processing is returned to step S4 and continued.

When the scanning is finished for every layer Ly, the angle and the orientation of the finger are calculated based on information about differences that are obtained on the layers Ly (step S8). Here, it is determined whether or not the finger touching the operation surface 7s leaves (step S9), and when the finger leaves, the processing is returned to step S1 and continued.

When the finger does not leave, the determination of the angle θ of the finger is subsequently made (step S10). The scroll-down processing is performed (step S11) when it is determined to be an acute angle, and the scroll-up processing is performed (step S12) when it is determined to be an obtuse angle. After performing those processings, the sensitivity and the threshold value of the touch sensor is reset for the layer Ly1 (step S13), and the processing is returned to step S4 and continued.

Performing the processings allows the user to perform the scroll-up/down operation only by changing the angle which the operation surface 7s forms with the finger by bending the finger without moving the finger away from the operation 7s.

Further, in the examples that are illustrated in FIGS. 8A, 8B and 9, the angles which the operation surface 7s forms with the finger are fixedly set, however there is not limitation thereto. The angle of the finger, which is calculated when the touch is detected, may be determined to be a reference point to achieve the scroll-up/down operation based on the size of amount of a change occurring from the reference point in an acute direction (a direction away from the normal of the operation surface 7s) or an obtuse direction (a direction approaching the normal of the operation surface 7s). Performing such control allows for achieving a correct operation even though the angle which the finger forms with the operation surface 7s near the upper part of the display unit 7s becomes closer to an acute angle or the angle which the finger forms with the operation surface 7s near the lower part of the display unit 7s becomes closer to an obtuse angle.

Further, the operation performed based on the information about the angle of the finger and the orientation thereof is not limited to the scroll-up/down operation. Information about not only the upper and lower directions in the Y-direction of the operation surface 7s, but also the 360° directions (orientations) on the XY surface and the 180° angles in the Z direction may be acquired, and the details thereof may be used to control an application.

Figure 10:
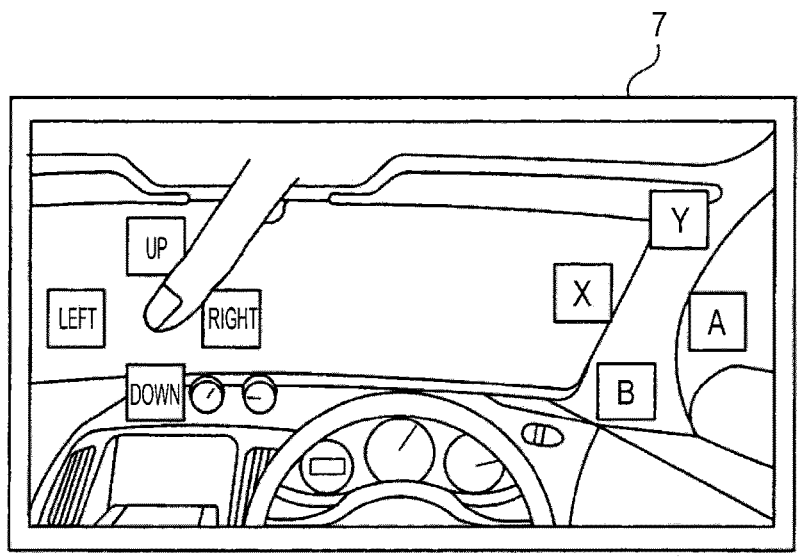
FIG. 10 is an explanatory diagram illustrating an exemplary screen image produced when information about the angle and the orientation of the finger touching the operation surface is used to control an application of a racing game.

FIG. 10 is a diagram illustrating an exemplary applicability of the present disclosure to an application of a racing game. In FIG. 10, a screen image of the touch panel 7, which is exemplarily displayed while the application of the racing game is executed, is illustrated. At the spot where characters "up", "down", "left", and "right" are boxed and displayed on the left side of the screen image, detected orientations of fingers are assigned to up and down, and left and right directions (forward, backward, left turn, and right turn) that are set for a steering wheel operation. Incidentally, when the orientation of the finger is detected not only in the up and down, and left and right directions, but also in the 360° directions, the user can select the traveling direction of a vehicle from among the 360° directions. At the spot where characters "X", "Y", "A", and "B" are boxed and displayed on the right side of the screen image, detected orientations of a finger are assigned to keys (functions) "X", "Y", "A", and "B". That is, the tilt of a finger allows for achieving the same operations as operations that are performed through the use of a physical joystick. For example, it becomes also possible to determine the speed of a vehicle, etc., based on information about the angle of a finger with respect to the operation surface 7s.

Figure 11:
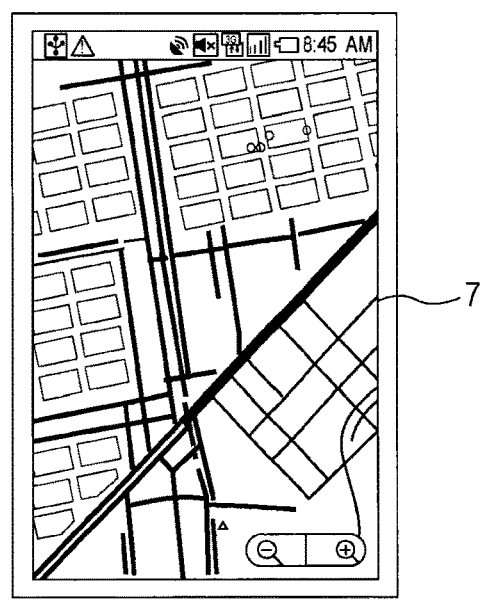
FIG. 11 is an explanatory diagram illustrating an exemplary screen image produced when the information about the angle and the orientation of the finger touching the operation surface is used to control an application of a map viewer.

FIG. 11 is a diagram illustrating an exemplary applicability of the present disclosure to an application of a map viewer. In FIG. 11, an exemplary screen image displayed while the application of the map viewer is executed is illustrated. When an operation achieved by tilting a finger in a desired direction at an arbitrary spot on a displayed map is input, control is performed to move a display spot in the direction from which the tilt is detected. Further, when an operation achieved by tilting a finger in the direction of a plus mark is input at the spot where the plus mark and/or a minus mark is provided at the lower right of the screen image, the magnification of the display may be increased (zoom-in). When an operation achieved through tilting the finger in the minus mark direction is input, the magnification of the display may be decreased (zoom-out).

Figure 12:
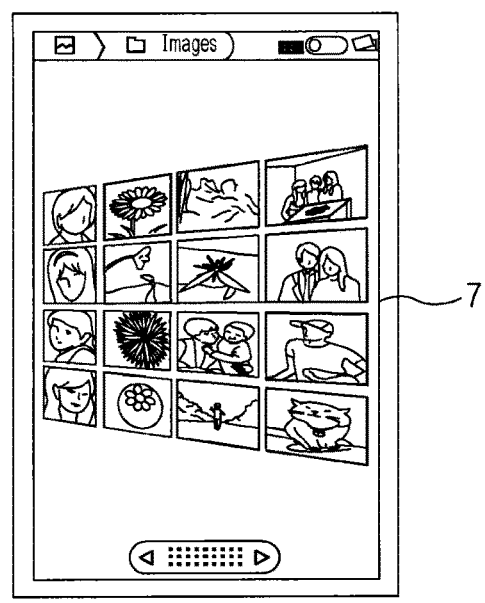
FIG. 12 is an explanatory diagram illustrating an exemplary screen image produced when the information about the angle and the orientation of the finger touching the operation surface is used to control an application of an image viewer.

FIG. 12 is a diagram illustrating an exemplary applicability of the present disclosure to an application of an image viewer. In FIG. 12, the state where images and video that are shot with the image pickup unit 12 (see FIG. 2), or images and video that are acquired with the communication processing unit 2 and/or the radio communication processing unit 15 are displayed as thumbnails is illustrated. When the operation achieved by tilting a finger in a desired direction at an arbitrary spot on a screen image is input in that state, control is performed to move the images and/or the video that are displayed as the thumbnails in a specified direction on the plane of the operation surface 7s, which corresponds to the direction in which the finger is tilted.

An application to which the control of the present disclosure is applied is not limited to the above-described applications, but can be applied to various applications.

According to an embodiment of the above-described present disclosure, a user is allowed to perform various operations through an intuitive and easy method such as bending or leaning the finger which is brought into contact with the operation surface 7s without adding a special device to the terminal device.

Further, according to an embodiment of the present disclosure, the angle and the orientation of a finger are determined by acquiring not only capacitance values that are obtained on the operation surface 7s, but also capacitance values that are obtained on imaginary planes that are away from the operation surface 7s by as much as specified distances. Consequently, the determination is made with higher precision.

Further, according to an embodiment of the present disclosure, the angle and the orientation of the finger touching the operation surface 7s are determined based on information about the difference between the distribution of recently acquired capacitance values and the distribution of previously acquired capacitance values. Consequently, capacitance values that are obtained on a high layer separated from the operation surface 7s, such as the layer Ly3, etc., can also be used as a source of the determination of the angle and the orientation of the finger. As a result, it becomes possible to determine the angle of the finger and the orientation thereof with higher precision.

Further, according to an embodiment of the present disclosure, the scanning of capacitance values that are obtained on the layer Ly1 to the layer Ly3 is started only after the finger touch on the operation surface 7s is detected. Consequently, the angle and the orientation of a finger touching the operation surface 7s can be determined without significantly increasing the consumption power.

[5. Exemplary Modifications of Various Types]

Further, according to the above-described embodiments, the applications are exemplarily controlled by determining the angle and the orientation of a single finger touching the operation surface 7s, however there is no limitation thereto. For example, when an operation is performed with two fingers, an application may be controlled by acquiring information about the angles and the orientations of both the fingers.

Figure 13A:
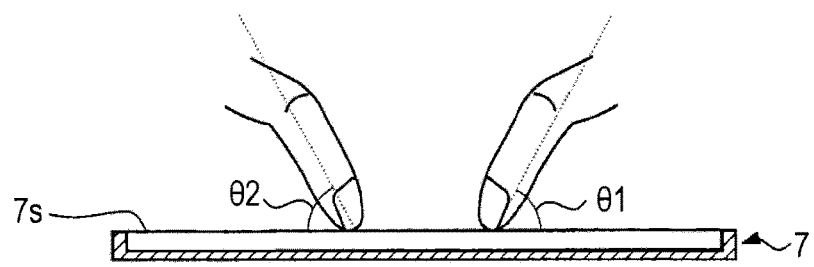
FIGS. 13A-13B are explanatory diagrams illustrating exemplary changes in the angles that fingers touching the operation surface make with the operation surface according to an exemplary modification of the present disclosure, where 13A illustrates an example where the angles are obtuse angles and 13B illustrates an example where the angles are acute angles.
Figure 13B:
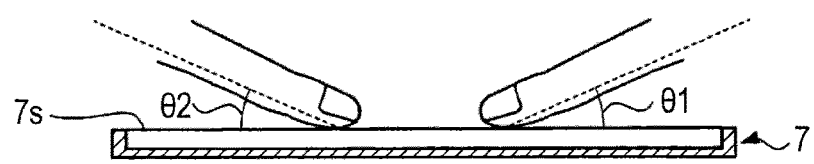

More specifically, when both an angle $\theta_1$ and an angle $\theta_2$ that the two fingers form with the operation surface 7s are obtuse angles as illustrated in FIG. 13A, control performed to zoom in on a display spot is continued while the angles are detected. When both the angle $\theta_1$ and the angle $\theta_2$ that the two fingers form with the operation surface 7s are acute angles as illustrated in FIG. 13B, control performed to zoom out on a display spot is continued while the angles are detected.

The definitions of the acute angles and the obtuse angles may be fixedly set as is the case with the above-described embodiments. That is, it may be considered that an acute angle is achieved in the case where the angle $\theta$ is $0° < \theta \leq 30°$ and an obtuse angle is achieved in the case where the angle $\theta$ is $60° < \theta \leq 90°$, and the definitions may be given as the amount of changes from an angle determined to be a reference point detected at the touch time. Then, when a neutral angle which is between the acute angle and the obtuse angle is achieved, the zoom-in processing or the zoom-out processing is stopped.

Further, in the above-described embodiments, the applications are controlled based only on the information about the angle and the orientation of the finger touching the operation surface 7s, however there is no limitation thereto. For example, the details of an operation may be determined based also on the touch area of a finger touching the operation surface 7s.

Figure 14A:
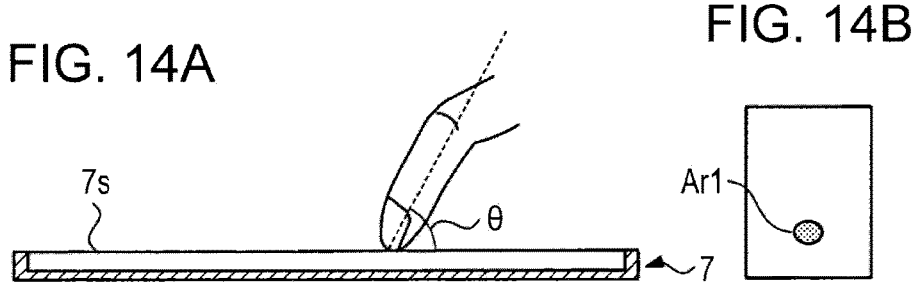
FIGS. 14A-14D are explanatory diagrams illustrating examples where a touch area defined on the operation surface is also referenced along with the angle of the finger according to an exemplary modification of the present disclosure, where 14A and 14B illustrate an example where the angle is an obtuse angle, and 14C and 14D illustrate an example where the angle is an acute angle.
Figure 14B:
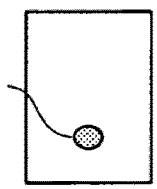
Figure 14C:
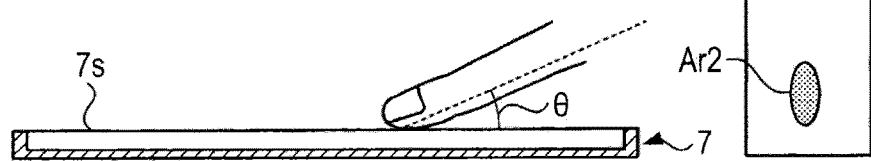
Figure 14D:
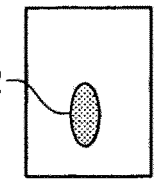

When the angle $\theta$ with respect to the operation surface 7s is an obtuse angle and the degree of the finger touch is low as illustrated in FIG. 14A, an area Ar1 of the finger touch, which is defined on the operation surface 7s, becomes narrow as illustrated in FIG. 14B. On the other hand, when the angle $\theta$ with respect to the operation surface 7s is an acute angle and the degree of the finger touch is high (a force pushing from above is acting) as illustrated in FIG. 14C, an area Ar2 of the finger touch, which is defined on the operation surface 7s, becomes an oval and large area as illustrated in FIG. 14D. Such changes in the finger angle and those in the touch area Ar are detected when, for example, the user performs an operation by, firstly, lightly touching the operation surface 7s with a finger at an acute angle, then tilting the finger while retaining the touch state, and firmly pushing the operation surface 7s.

That is, an applicability of the present disclosure to the case where a button, etc. is continuously pressed without moving a finger off the button to perform an operation for a game or the like is achieved. When the determination of a continuous press operation performed for a specified spot on a screen image, the specified spot corresponding to the button, is made based not only on changes in the area Ar of a touch on the operation surface 7s, but also on the angle and the orientation of the finger, the precision thereof is more increased.

Further, according to the above-described embodiments, the input detection unit of the present disclosure exemplarily acquires capacitance values that are output from a sensor achieved under the mutual capacitance system of the projected capacitance system, however there is no limitation thereto. An embodiment of the present disclosure may be applied to any configuration, as long as the configuration allows for detecting a physical position in the Z direction from the operation surface 7s to a finger. For example, the physical distance from the operation surface 7s to a finger m may be calculated by analyzing video shot with a camera, etc.

Further, according to the above-described embodiments, layers where the capacitance values are detected include four layers, that is, the operation surface 7s, the layer Ly1, the layer Ly2, and the layer Ly3, however there is no limitation to that number. The layers may be provided regardless of its number as long as the detection is performed at least on the surface 7s.

Further, even though the angle and the orientation of a finger are calculated based only on the capacitance values exceeding the specified threshold value Th on each layer according to the above-described embodiments, the calculation may be performed based on every capacitance value detected with set sensitivity without determining the threshold value Th.

Further, according to the above-described embodiments, the terminal device of the present disclosure is exemplarily applied to the mobile phone terminal device, however there is no limitation thereto. An embodiment of the present disclosure may be applied to a different terminal device including a personal computer, a tablet-type terminal, a game machine, an audio player, a digital still camera, a digital video camera, and so forth.

Further, a series of processings performed according to the above-described embodiments may be executed not only by hardware, but also by software. When executing the series of processings by the software, a computer having specifically designed hardware where a program constituting the software is installed, or a computer where a program achieved to execute various functions is installed may be provided for the execution. For example, a program constituting desired software may be installed in a general-purpose computer, etc. for the execution.

Further, a storage medium storing program code of software for implementing the functions of the above-described embodiments may be supplied to a system or an apparatus. Further, it is needless to say that a computer (or a control device such as a CPU) of the system or the apparatus may read and execute the program code stored in the storage medium so that the functions are implemented.

The storage medium provided for supplying the program code may include, for example, a flexible disk, a hard disk, an optical disk, a magneto-optical disk, a CD-ROM, a CD-R, a magnetic tape, a non-volatile memory card, a ROM, etc.

Further, the functions of the above-described embodiments are implemented by the computer reading and executing the program code. Additionally, an OS or the like running on the computer executes part of or the entire actual processing based on instructions of the program code. The functions of the above-described embodiments may be implemented by the processing, which is also one of embodiments of the present disclosure.

Further, it is taken for granted that the present disclosure is not limited to the above-described embodiments, but may be applied and modified in different and various ways without leaving the spirit of the present disclosure, which is written in the claims. It should be understood by those skilled in the art that various modifications, combinations, and other exemplary embodiments may occur depending on design and/or other factors insofar as they are within the scope of the claims or the equivalents thereof, as a matter of course.

Incidentally, the present disclosure may be configured as below.

(1) An information processing apparatus including: a display; a touch panel formed on or integrally with the display and configured to detect an object touching or approaching the touch panel; and circuitry configured to detect a change in an angle that the object forms with the touch panel based on an output of the touch panel, and control content displayed on the display based on the detected change in angle.

(2) The information processing apparatus of (1), wherein the touch panel is configured to detect a capacitance value that changes due to the object touching or approaching the touch panel, and a position on the touch pane where the capacitance value is changed.

(3) The information processing apparatus of (2), wherein the circuitry is configured to detect the change in the angle that the object forms with the touch panel based on a difference between first capacitance values detected on the touch panel and second capacitance values detected on an imaginary plane parallel to the touch panel based on the output of the output of the touch panel.

(4) The information processing apparatus of (3), wherein the circuitry is configured to calculate an angle that the object forms with the touch panel and a direction of a tilt of the object with respect to the touch panel based on the difference between the first and second capacitance values.

(5) The information processing apparatus of (4), wherein the circuitry is configured to detect the change in the angle that the object forms with the touch panel based on information corresponding to a direction and amount of change in a second distribution of the second capacitance values with respect to a first distribution of the first capacitance values.

(6) The information processing apparatus of any of (3) to (5), wherein the second capacitance values are capacitance values that are detected through the touch panel with the touch panel's sensitivity set higher than a sensitivity set when the first capacitance values are detected.

(7) The information processing apparatus of any of (3) to (6), wherein the first capacitance values are capacitance values exceeding a first threshold value, and the second capacitance values are capacitance values exceeding a second threshold value, which is smaller than the first threshold value.

(8). The information processing apparatus of any of (4) to (7), wherein the circuitry is configured to control the display to move the content displayed on the display in a first direction when the angle that the object forms with the touch panel falls within a first angle range; and control the display to move the content displayed on the display in a second direction, which is different from the first direction, when the angle falls within a second angle range of which value is smaller than a value of the first angle range.

(9) The information processing apparatus of (8), wherein the circuitry is configured to control the display to stop moving the content displayed on the display when he angle falls within a third angle range, which is smaller than a minimum value of the first angle range and larger than a maximum value of the second angle range.

(10) The information processing apparatus of any of (4) to (9), wherein the circuitry is configured to: control the display to move the content displayed on the display in a first direction when a direction of change in the angle that the object forms with the touch panel from an angle attained when the object touches the touch panel is a leaving direction approaching a normal of the touch panel and an amount of the change from the angle attained when the object touches the touch panel is larger than a specified change amount; and control the display to move the content displayed on the display in a second direction which is different from the first direction when a direction of change from the angle attained when the object touches the touch panel is a direction leaving from the normal of the touch panel and the amount of the change from the angle attained when the object touches the touch panel is larger than the specified change amount.

(11) The information processing apparatus of any of (4) to (10), wherein the circuitry is configured to control the display to move the content displayed on the display in a direction specified on a plane of the touch panel, which corresponds to the direction of the tilt of the object with respect to the touch panel.

(12) The information processing apparatus of any of (4) to (11), wherein the circuitry is configured to control the display to enlarge a size the content displayed on the display when the angle that the object forms with the touch panel falls within a first angle range; and control the display to reduce the size of the content displayed on the display when the angle that the object forms with the touch panel is an angle falling within the second angle range smaller than the first angle range.

(13) The information processing apparatus of (12), wherein the circuitry is configured to control the display to stop changing the size of the content displayed on the display when the angle that the object forms with the touch panel is a third angle which is larger than the first angle range and smaller than the second angle.

(14) The information processing apparatus of any of (4) to (13), wherein the circuitry is configured to control the content displayed on the displayed based on the angle that the object forms with the touch panel and a touch area where the object touches the touch panel.

(15) A method performed by an information processing apparatus, the method comprising: detecting, at a touch panel formed on or integrally with a display, an object touching or approaching the touch panel; determining a change in an angle that the object forms with the touch panel based on an output of the touch panel; and controlling content displayed on the display based on the determined change in angle between the object and the touch panel.

(16) A non-transitory computer-readable medium including computer-program instructions, which when executed by an information processing apparatus, cause the information processing apparatus to execute: detecting, at a touch panel formed on or integrally with a display, an object touching or approaching the touch panel; determining a change in an angle that the object forms with the touch panel based on an output of the touch panel; and controlling content displayed on the display based on the determined change in angle between the object and the touch panel.

The invention claimed is:

1. An information processing apparatus comprising:
a display;
a touch panel formed on or integrally with the display and configured to detect an object touching or approaching the touch panel; and
circuitry configured to
detect an angle that the object forms with the touch panel based on first capacitance values detected on the touch panel and second capacitance values detected on an imaginary plane located above and parallel to a planar surface of the touch panel based on an output of the touch panel; and
control content displayed on the display based on the detected angle.

2. The information processing apparatus of claim 1, wherein
the touch panel is configured to detect a capacitance value that changes due to the object touching or approaching the touch panel, and a position on the touch panel where the capacitance value is changed.

3. The information processing apparatus of claim 2, wherein
the circuitry is configured to detect a change in the angle that the object forms with the touch panel based on a difference between the first capacitance values detected at the touch panel and the second capacitance values detected at the imaginary plane parallel to the touch panel based on the output of the touch panel.

4. The information processing apparatus of claim 3, wherein
the circuitry is configured to calculate an angle that the object forms with the touch panel and a direction of a tilt of the object with respect to the touch panel based on the difference between the first and second capacitance values.

5. The information processing apparatus of claim 4, wherein
the circuitry is configured to detect a change in the angle that the object forms with the touch panel based on information corresponding to a direction and amount of change in a second distribution of the second capacitance values with respect to a first distribution of the first capacitance values.

6. The information processing apparatus of claim 4, wherein
the circuitry is configured to
control the display to move the content displayed on the display in a first direction when the angle that the object forms with the touch panel falls within a first angle range; and
control the display to move the content displayed or the display in a second direction, which is different from the first direction, when the angle falls within a second angle range of which value is smaller than a value of the first angle range.

7. The information processing apparatus of claim 6, wherein
the circuitry is configured to control the display to stop moving the content displayed on the display when he angle falls within a third angle range, which is smaller than a minimum value of the first angle range and larger than a maximum value of the second angle range.

8. The information processing apparatus of claim 4, wherein
the circuitry is configured to:
control the display to move the content displayed on the display in a first direction when a direction of change in the angle that the object forms with the touch panel from an angle attained when the object touches the touch panel is a leaving direction approaching a normal of the touch panel and an amount of the change from the angle attained when the object touches the touch panel is larger than a specified change amount; and
control the display to move the content displayed on the display in a second direction which is different from the first direction when a direction of change from the angle attained when the object touches the touch panel is a direction leaving from the normal of the touch panel and the amount of the change from the angle attained when the object touches the touch panel is larger than the specified change amount.

9. The information processing apparatus of claim 4, wherein
the circuitry is configured to control the display to move the content displayed on the display in a direction specified on a plane of the touch panel, which corresponds to the direction of the tilt of the object with respect to the touch panel.

10. The information processing apparatus of claim 4, wherein
the circuitry is configured to
control the display to enlarge a size the content displayed on the display when the angle that the object forms with the touch panel falls within a first angle range; and
control the display to reduce the size of the content displayed on the display when the angle that the object forms with the touch panel is an angle falling within the second angle range smaller than the first angle range.

11. The information processing apparatus of claim 10, wherein
the circuitry is configured to control the display to stop changing the size of the content displayed on the display when the angle that the object forms with the touch panel is a third angle which is larger than the first angle range and smaller than the second angle.

12. The information processing apparatus of claim 4, wherein
the circuitry is configured to control the content displayed on the displayed based on the angle that the object forms with the touch panel and a touch area where the object touches the touch panel.

13. The information processing apparatus of claim 3, wherein
the second capacitance values are capacitance values that are detected through the touch panel with the touch panel's sensitivity set higher than a sensitivity set when the first capacitance values are detected.

14. The information processing apparatus of claim 3, wherein
the first capacitance values are capacitance values exceeding a first scanning threshold value, and the second capacitance values are capacitance values exceeding a scanning second threshold value, which is smaller than the first threshold value.

15. A method performed by an information processing apparatus, the method comprising:
detecting, at a touch panel formed on or integrally with a display, an object touching or approaching the touch panel;
determining an angle that the object forms with the touch panel based on first capacitance values detected on the touch panel and second capacitance values detected on an imaginary plane located above and parallel to a planar surface of the touch panel based on an output of the touch panel; and
controlling content displayed on the display based on the determined angle between the object and the touch panel.

16. A non-transitory computer-readable medium including computer-program instructions, which when executed by an information processing apparatus, cause the information processing apparatus to execute:
detecting, at a touch panel formed on or integrally with a display, an object touching or approaching the touch panel;
determining an angle that the object forms with the touch panel based on first capacitance values detected on the touch panel and second capacitance values detected on an imaginary plane located above and parallel to a planar surface of the touch panel based on an output of the touch panel; and
controlling content displayed on the display based on the determined angle between the object and the touch panel.

* * * * *